United States Patent [19]
Osaki

[11] Patent Number: 5,249,267
[45] Date of Patent: Sep. 28, 1993

[54] IMAGE PROCESSING APPARATUS AND METHOD

[75] Inventor: Eiji Osaki, Yokohama, Japan

[73] Assignee: Kabushiki Kaisha Toshiba, Kawasaki, Japan

[21] Appl. No.: 900,501

[22] Filed: Jun. 12, 1992

Related U.S. Application Data

[63] Continuation of Ser. No. 371,725, Jun. 27, 1989, abandoned.

Foreign Application Priority Data

Jun. 30, 1988 [JP] Japan ................. 63-160770

[51] Int. Cl.⁵ .................................. G06F 15/20
[52] U.S. Cl. ...................... 395/166; 395/165; 395/162
[58] Field of Search .......... 340/747, 750; 395/162, 395/164, 165, 166, 133; 364/246.2, 246.5, 966.5

[56] References Cited

U.S. PATENT DOCUMENTS

| | | | |
|---|---|---|---|
| 3,976,982 | 8/1976 | Eiselen | 235/151 |
| 4,554,638 | 11/1985 | Iida | 364/521 |
| 4,821,171 | 4/1989 | Calamari | 364/200 |
| 4,890,223 | 12/1989 | Cruess et al. | 364/200 |
| 4,891,752 | 1/1990 | Fairman et al. | 364/200 |

Primary Examiner—Phu K. Nguyen
Attorney, Agent, or Firm—Cushman, Darby & Cushman

[57] ABSTRACT

An apparatus and method for processing image data employs a memory controller, a converting memory an an processor. The memory controller generates firs address data corresponding to the image data at predetermined coordinates and converts the first address data into second address data corresponding to different coordinates from the predetermined coordinates. The converting memory stores the image data at addresses corresponding to the second address data. The processor processes levels of the image data stored in the converting memory.

25 Claims, 6 Drawing Sheets

IMAGE PROCESSING APPARATUS AND METHOD

This is a continuation of application No. 07/371,725, filed on Jun. 27, 1989, which was abandoned.

BACKGROUND OF THE INVENTION

1. Field of the Invention

This invention relates to an apparatus and method for processing imaging signals. More specifically, the invention relates to an image signal processing apparatus and method which has application in medical or industrial computer tomography, supersonic crack detection, radar equipment, etc.

2. Description of the Related Art

Figure 8:
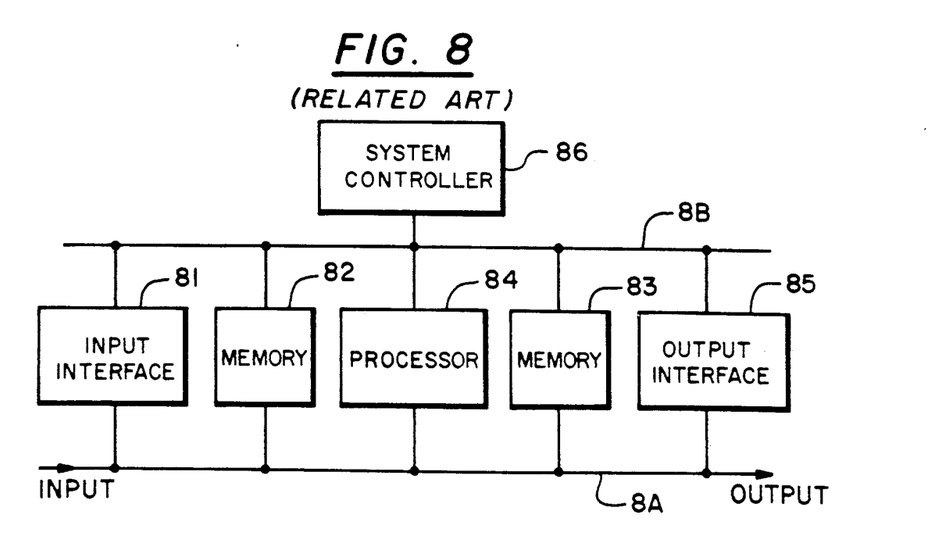
FIG. 8 is a block diagram of a known image processing apparatus.

In apparatus for processing imaging signals, geometrical conversion of an input image, such as magnification, reduction, rotation or parallel movement is often performed. FIG. 8 is a block diagram of a well-known processing apparatus.

This image processing apparatus includes an input interface 81, memories 82 and 83, a specialized signal processor 84, an output interface 85 and a system controller 86. A digital image signal from an imaging device, such as a CCD camera, is supplied to memory 82 through input interface 81 and data bus 8A. Memory 82, which has a capacity equal to at least one frame, stores a digital image data corresponding to a level of the image signal. Signal processor 84 reads the digital data from either memory 82 or memory 83, processes the digital data to obtain a desired image, and stores the data in the other of memories 82 and 83. Moreover, processor 84 converts the addresses of the digital data as stored in memory 82. That is, processor 84 calculates a new address, for memory 83 at which the digital image data is to be stored, for each picture cell, to execute geometrical conversion of the image as it is transferred from memory 82 to memory 83. This address conversion corresponds to a conversion of coordinates of the image. The digital data stored at the converted address in memory 83 is supplied to a data output means (not shown), such as an image displaying device, through data bus 8A and output interface 85. System controller 86 controls interfaces 81 and 85, memories 82 and 83 and signal processor 86 through a control bus 8B.

One typical type of geometrical conversion of image data is called an affine conversion which is a first order conversion (variables need not be raised to any power greater than one). Usually processor 84 can only perform first order conversions of geometrical data because the calculations for higher order conversions is complicated. Also, various processes, such as writing data as radius vectors in a memory and adding data following a rotation, are used in synthetic aperture processing for underground survey radar, supersonic crack detectors and in geometrical conversions for industrial X-ray CT equipment etc. Even these first order processes are very difficult because memory 82 usually stores data corresponding to orthogonal coordinates, even if the process is simple in polar coordinates. As a result, processing speed deteriorates.

SUMMARY OF THE INVENTION

It is an object of the present invention to improve the processing speed for a geometrical conversion of image data.

It is a further object of the present invention to simplify signal processing of a geometrical conversion of image data.

It is still a further object of the present invention to reduce the burden on a specialized signal processor used for the geometrical conversion of image data.

To achieve the above objects and in accordance with the purpose of the invention, as embodied and broadly described herein, the invention provides an apparatus for processing image data formed at predetermined coordinates. A first address data corresponding to the image data at the predetermined coordinates is generated and converted into second address data corresponding to coordinates different from the predetermined coordinates. The converting is performed by a controller for a converting memory. In response to the second address data, the converting memory stores the image data at the address corresponding to the second address data. Finally, a characteristic of the image data, such as the level of the data, stored in the converting memory is processed. This processing is performed by a processor separate from the converting memory controller.

BRIEF DESCRIPTION OF THE DRAWINGS

The present invention is best understood with reference to accompanying drawings in which.

DETAILED DESCRIPTION OF THE PREFERRED EMBODIMENT

Referring to the accompanying drawings, an embodiment of the present invention will be described.

Figure 1:
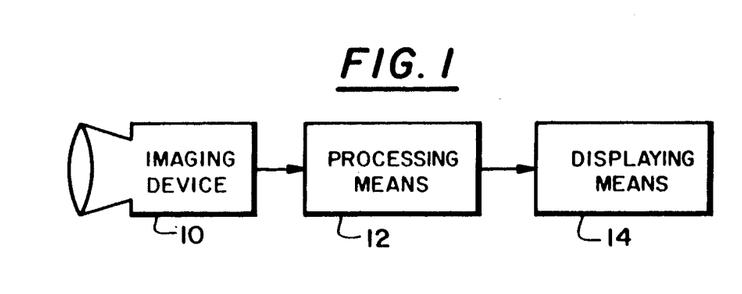
FIG. 1 is a block diagram of an imaging apparatus.

As shown in FIG. 1, an imaging apparatus includes an imaging device 10, a processing means 12 and a displaying means 14. Imaging device 10 is a device for producing image signals corresponding to an object being viewed. Imaging device 10 may be a supersonic sensor, a microwave sensor or a charge coupled device (CCD), or may be a memory device storing image data. Processing means 12 is a device for processing image data from imaging device 10 and includes apparatus according to one aspect of this invention. Displaying means 14 is a device for displaying an image corresponding to image data from processing means 12. Displaying means 14 can be replaced with another receiving device, such as a memory device or a computer, etc.

Figure 2:
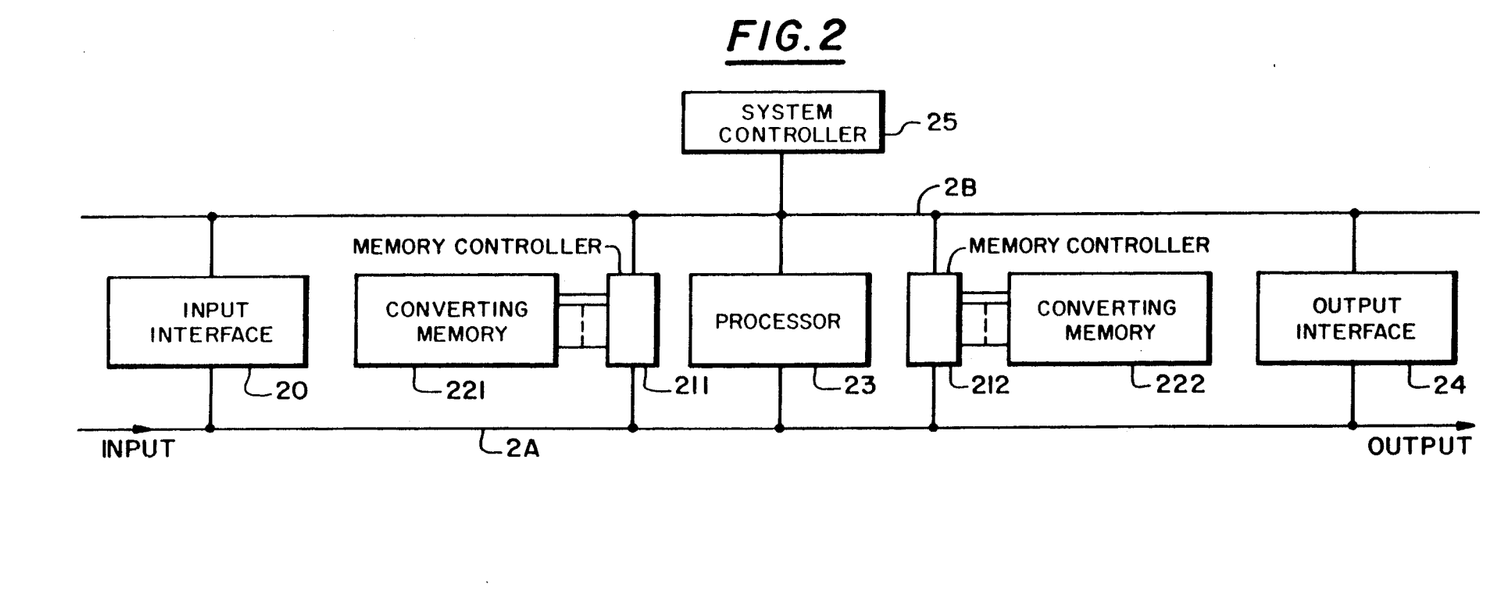
FIG. 2 is a block diagram of an apparatus according to one embodiment of this invention.

FIG. 2 is a block diagram of processing means 12 shown in FIG. 1. Image data from imaging device 10 are supplied to a memory controller 211 through an input interface 20 and data bus 2A. Memory controller 211 executes a conversion of image coordinates. That is, memory controller 211 generates address information which is different from addresses in an image memory, which memory is included in the memory controller and in which input image data is stored, and controls the writing of image data at the generated address in a converting memory 221. A processor 23 processes the image data for a particular purpose, such as remote sensing or medical diagnosis, etc.

The image data stored in converting memory 221 are supplied to a displaying means 14 or another output device through data bus 2A and an output interface 24 after processing by processor 23. A memory controller 212 and a converting memory 222 may be used for address conversion of the data stored in converting memory 221. Also memory controller 211 and the converting memory 221 may be used for the conversion of data stored in memory 222. Memory controller 212 and converting memory 222 may not always be employed.

Moreover, the memory controller 211 is a specialized controller for controlling the memory 221. So we may call the memory 221 and the memory controller 211 as only a memory, which memory has a converting function of image coordinates.

A system controller 25 controls input interface 20, memory controllers 211 and 212, processor 23 and output interface 24 through control bus 2B.

Figure 3:
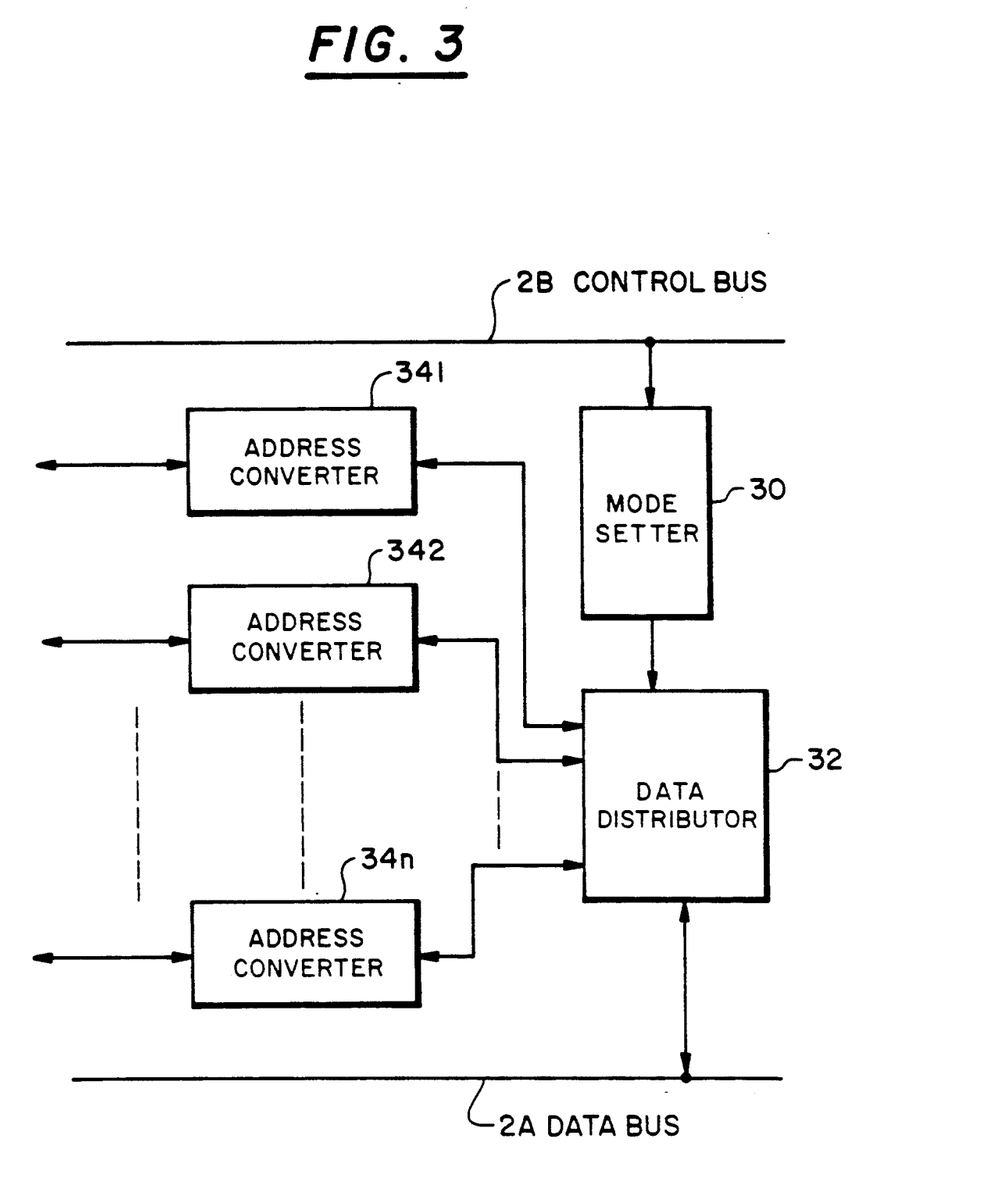
FIG. 3 is a block diagram of the memory controller shown in FIG. 2.

FIG. 3 shows a block diagram of memory controllers 211 and 212. Memory controllers 211 and 212 include a mode setter 30, a data distributor 32 and address converters 341, 342.—, 34N. Image data are supplied to data distributor 32 through data bus 2A. Mode setter 30 receives a signal specifying the conversion of the coordinates from processor 23 through control bus 2B and outputs mode setting signals and controls data distributor 32 so that image data can be supplied to a defined one of address converters 341, 342,—, 34N. Address converters 341, 342,—, 34N are each able to convert the address of the image data by a different converting function. The image data after the address conversion are stored in memory 221 or 222. The image data in the memory 221 or 222 can be read out to be supplied to the data bus 2A through one of the address converters 341, 342,—, 34N and the data distributor 32 according to a command from processor 23.

Figure 4:
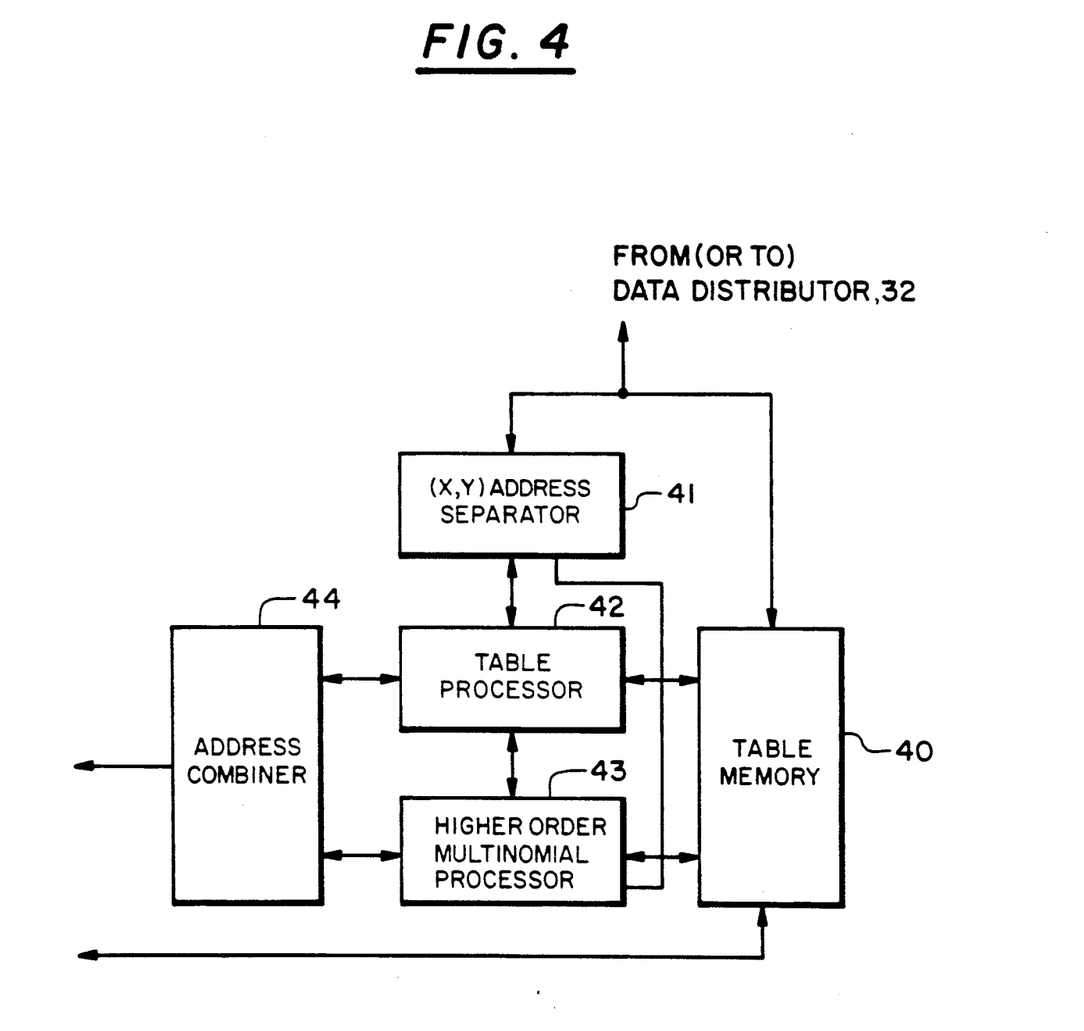
FIG. 4 is a block diagram of the address converter shown in FIG. 3.
Figure 5:
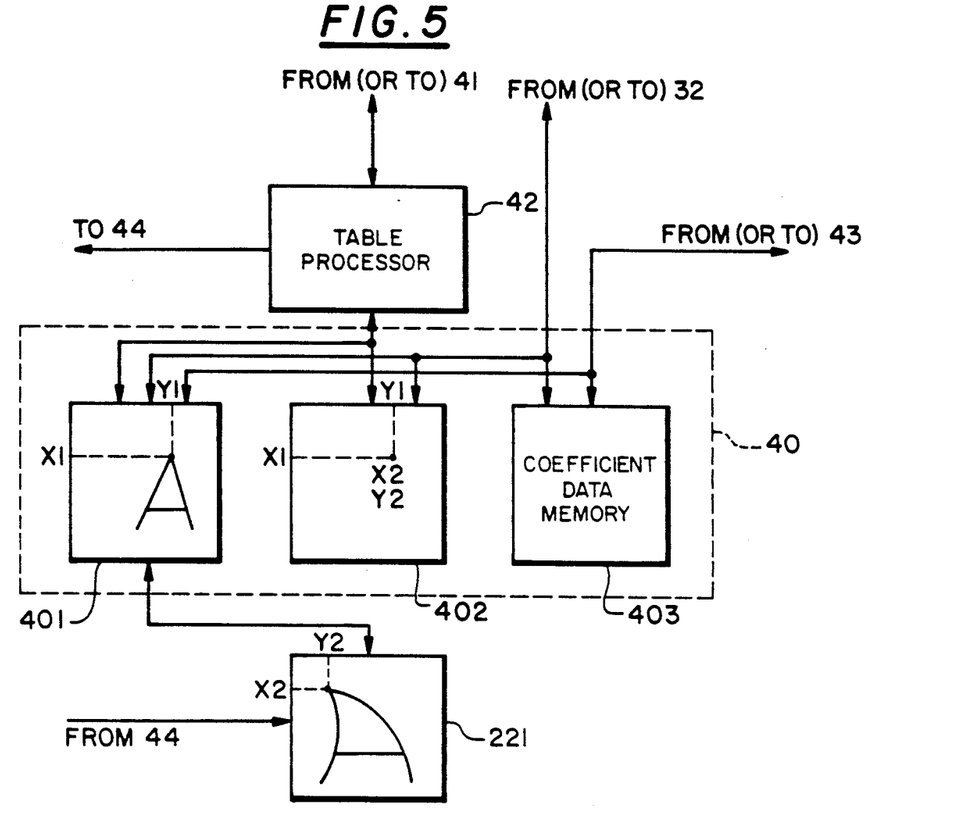
FIG. 5 illustrates operations of the address converter shown in FIG. 3.

Each address converter may be constituted as shown in FIG. 4. The address converter includes a table memory 40, an address separator 41, a table processor 42, a higher order multinomial processor 43 and an address combiner 44. Table memory 40 includes an image data memory 401, an address data memory 402 and a coefficient data memory 403 as shown in FIG. 5. The image data from data distributor 32 is supplied to table memory 40 and is stored in image data memory 401. Address data memory 402 stores address data for converting memory 221 to convert the address of the image data. Coefficient data memory 403 stores the coefficient data used in a calculation of a higher order multinomial equation. In FIG. 4, address separator 41 separates the address data (X,Y) into X address data and Y address data to supply the appropriate address data to table processor 42 or multinomial processor 43. Table processor 42 operates to convert the address of the image data by using table memory 40. In FIG. 5, the addresses at which address data is stored in address data memory 402 correspond to addresses of image data memory 401. Moreover, the address data stored in address data memory 402 are addresses of converting memory 221 at which the image data stored in image data memory 401 should be stored. The relation between the addresses of data in memories 401 and 221 is based on a predetermined address conversion corresponding to the purpose of the image processing, such as remote sensing and medical diagnosis.

When the image data stored in memory 401 corresponds to a letter 'A' as shown in FIG. 5 and the geometric conversion is to be executed on the transfer of data to memory 221 as shown in FIG. 5, the image data at address (X1,Y1) of memory 401 can be stored at the address (X2,Y2) of memory 221. To accomplish this, address data (X2,Y2) is stored at the address (X1,Y1) of memory 402. Table processor 42, therefore, reads out the address data (X2,Y2) stored at the address (X1,Y1) of address data memory 402 and stores the image data, which is stored at the address (X1,Y1) of image data memory 401, at the address (X2,Y2) of output memory 221. In this case, the address data (X2,Y2) which table processor 42 reads out is supplied to address combiner 44 to generate an address signal including both an X and a Y address in order to access output memory 221. Address data memory 402 can store plural address data for converting memory 221 at one address, such as address (X1,Y1), according to the geometrical conversion. The same conversion as mentioned above may be executed as to all addresses of the image data.

Alternatively or at the same time, higher order polynomial processor 43 reads out coefficient data from coefficient data memory 403 according to the address information from separator 41 to obtain a converted address by using a polynomial equation. The converted X and Y addresses are calculated separately and are combined in address combiner 44 to generate the address signal in order to access converting memory 221. Generally, there are many cases that a mathematical equation for the conversion from orthogonal coordinates to another coordinate system can be approximated with a higher order polynomial equation.

Thus, it may be useful to execute ordinary address conversions using polynomial processor 43 and execute more particular address conversions using table processor 42. Of course, address conversion may be executed employing both processors 42 and 43.

Figure 6:
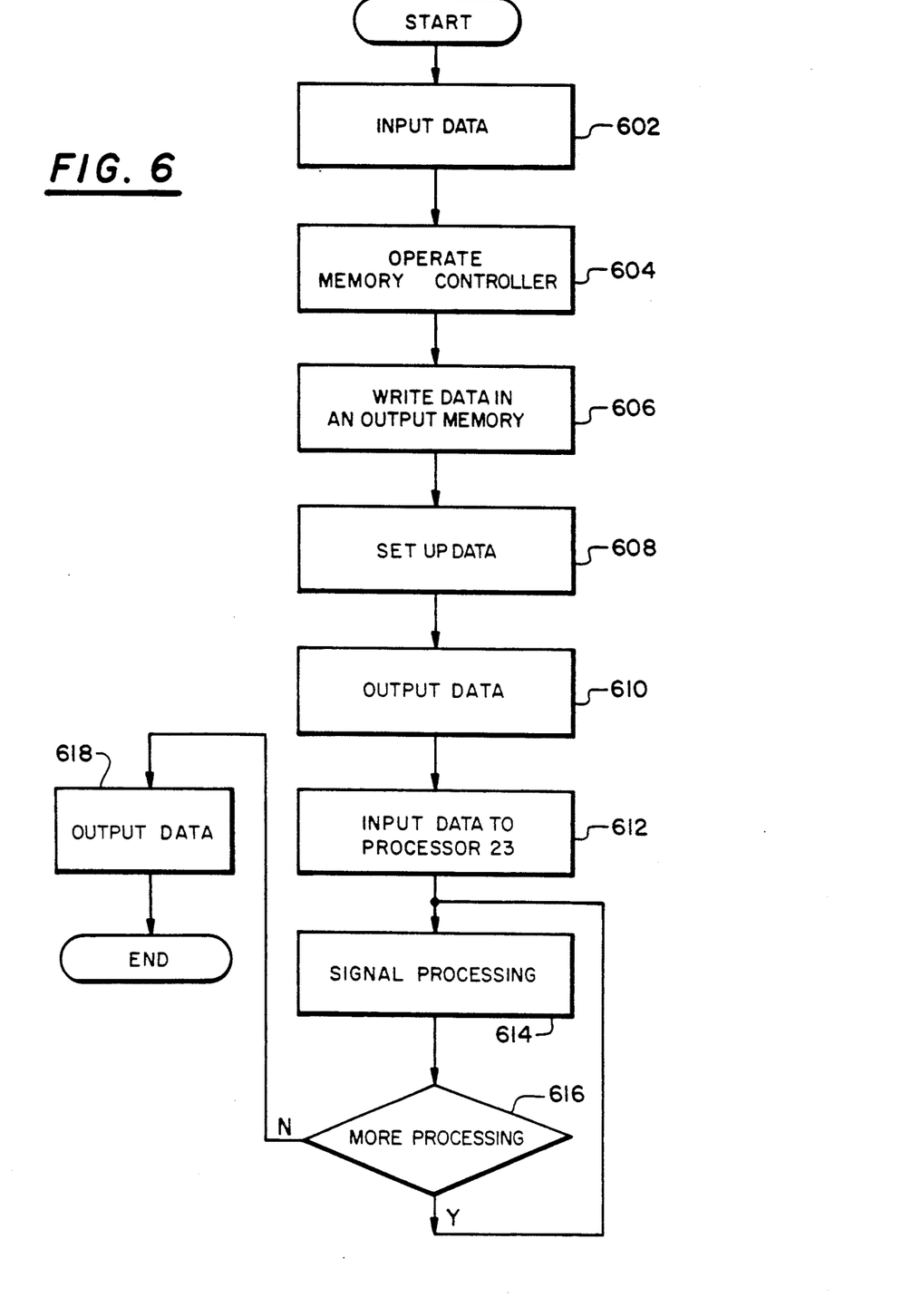
FIG. 6 shows a flow chart illustrating the operation of the apparatus shown in FIG. 2.

FIG. 6 shows a flow chart illustrating the operation of the apparatus shown in FIG. 2. The operation starts with the input of image data to memory controllers 211 and/or 212 through input interface 20 and data bus 2A at step 602. Memory controller 211 and/or 212 geometrically converts the address of the image data at step 604. The operation of step 604 is described later. After the conversion, the converted data is written in converting memory 221 and/or 222 at step 606.

To accomplish signal processing, a quantum of data is set in converting memory 221 and/or 222 at step 608 to be read out at step 610 through memory 401 and data bus 2A. Processor 23 is provided with the image data at step 612 and processes the image data. Such processing may include changing the level of the image data to alter the brightness of the image or compilation of the levels of the image data statistically at step 614. The flow goes back to step 614 when more signal processing is needed, or the flow goes to step 618 to output resultant data through data bus 2A and output interface 24.

Figure 7:
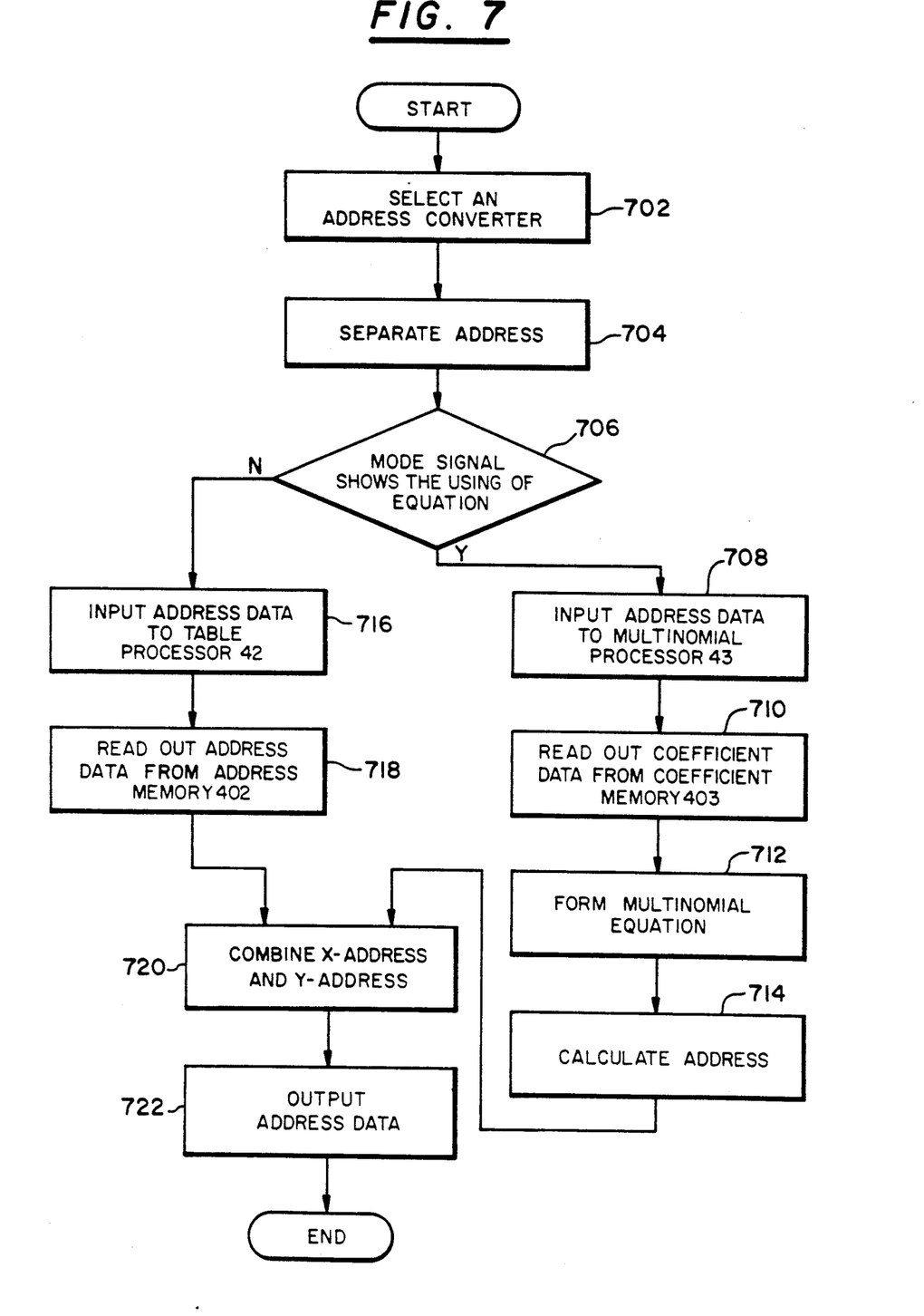
FIG. 7 shows a flow chart illustrating the address converting operation of the address converter shown in FIG. 4.

FIG. 7 shows a flow chart illustrating the operation of step 604 shown in FIG. 6 corresponding to the address converting operation of the block diagrams shown in FIGS. 3 and 4. The input image data and the address data are distributed by data distributor 32 according to a signal from mode setter 30 and are supplied to the designated address converter at step 702. The image data is supplied to image memory 401 in table memory 40. The address data is supplied to address separator 41 and is divided into an X address and a Y address at step 704. When the mode setting signal from mode setter 30 indicates that a higher order polynomial equation is to be used, as determined at step 706, the address data is supplied to multinomial processor 43 at step 708. Processor 43 reads out the coefficient data of the polynomial equation from memory 403 in table memory 40 at step 710 and forms the equation at step 712. The X address data and Y address data are substituted into the equations, such as the following equations:

$$Xn = ax^2 + bx + c$$

and $$Yn = dY^2 + eY + f,$$

(a, b, c, d, e, f: coefficients) and the new address Xn and Yn are calculated at step 714.

When the mode setting signal from mode setter 30 does not show that an equation is to be used as determined at step 706, the address data is supplied to table processor 42 at step 716. Processor 42 reads out the address data (X2,Y2) stored at the address (X1,Y1) in address memory 402 as shown in FIG. 5, at step 718. The new address data (X2,Y2) or (Xn, Yn) from table processor 42 or multinomial processor 43 are combined in address combiner 44 at step 720. The signal corresponding to the combined address data is output from combiner 44 at step 722 to access converting memory 221 and/or 222. Therefore, the addresses at which the image data are stored in converting memory 221 and/or 222 are changed according to the output signal from combiner 44.

In a preferred embodiment of the present invention, a function for processing the image data can be added in memory controller 211 and/or 212 in FIG. 2. Moreover, due to the capability of memory controller 211 and/or 212 to convert coordinates, memory controller 211 and/or 212 may also be used to compress data in images.

According to the present invention, it is possible to convert predetermined coordinates into other coordinates easily, such as from orthogonal coordinates to polar coordinates, oblique coordinates or parabolic coordinates. Moreover, it is possible to execute the conversion of coordinates using the memory controlling means. In this case, the burden on the processor, which is processing the image data, may be decreased since the processor need no longer perform calculations for the conversion. Therefore, it is possible with the present invention to provide an improved image processing apparatus that is suitable for high speed processing device, such as industrial, medical and remote sensing image processing apparatus, etc.

What is claimed is:

1. An apparatus for processing image data formed at predetermined coordinates identified by predetermined coordinate data, comprising:
converting memory means for storing the image data at second addresses therein, the second addresses being identified by second address data corresponding to second coordinates different than the predetermined coordinates;
means for controlling transfer of the image data to and from the converting memory means, the controlling means comprising:
  at least one address converting means for indicating a location in the converting memory means where the image data is to be stored, the at least one address converting means comprising:
    table memory means for storing the image data, third address data and coefficient data, the table memory means comprising:
      image memory means for storing the image data at first addresses in the image memory means, the first addresses being identified by first address data corresponding to the predetermined coordinates identified by the predetermined coordinate data,
      address memory means for storing the third address data at third addresses in the address memory means, the third addresses being identified by fourth address data corresponding to the first address data, and
      coefficient memory means for storing coefficient data;
    table processing means for reading out the third address data from the address memory means;
    multinomial processing means for reading out the coefficient data from the coefficient memory means and performing multinomial equation calculations in accordance with the coefficient data to derive fifth address data; and
    combining means, having an input coupled to the table processing means and the multinomial processing means and an output coupled to the converting memory means, for generating the second address data by performing one of the following operations:
      providing one of the third address data and the fifth address data as the second address data to access the converting memory means, and
      combining the third address data and the fifth address data to produce the second address data to access the converting memory means;
  the controlling means writing the image data in the second addresses of the converting memory means; and
means for processing a predetermined characteristics of the image data stored in the converting memory means.

2. The apparatus of claim 1, wherein the controlling means further comprises:
a plurality of the address converting means, each for indicating a different said location where the image data is to be stored;
setting means for generating a setting signal to select one of the address converting means; and
distributing means connected to the setting means for distributing the image data and the predetermined coordinate data to the address converting means selected by the setting means.

3. The apparatus of claim 1, wherein the second address data represents orthogonal coordinates.

4. The apparatus of claim 1, wherein the processing means includes means for changing predetermined characteristics of the image data.

5. The apparatus of claim 1, wherein the processing means includes means for compiling the predetermined characteristics of the image data statistically.

6. An apparatus for processing image data formed at predetermined coordinates, comprising:

imaging means for generating image data at the predetermined coordinates, the image data corresponding to an object, the predetermined coordinates being identified by predetermined coordinate data;

converting memory means for storing the image data;

means for controlling writing of the image data in the converting memory means comprising:

a plurality of address converting means for converting the predetermined coordinate data into second address data corresponding to coordinate different from the predetermined coordinates, the second address data being different for each of the address converting means, each of the address converting means comprising:

table memory means for storing the image data, third address data and coefficient data, the table memory means comprising:

image memory means for storing the image data at first addresses in the image memory means, the first addresses being identified by first address data corresponding to the predetermined coordinates identified by the predetermined coordinate data;

address memory means for storing the third address data at third addresses in the address memory means, the third addresses being identified by fourth address data corresponding to the first address data; and coefficient memory means for storing coefficient data;

table processing means for reading out the third address data from the address memory means;

multinomial processing means for reading out the coefficient data from the coefficient memory means and performing multinomial equation calculations in accordance with the coefficient data to derive fifth address data;

combining means, having an input coupled to the table processing means and the multinomial processing means and an output coupled to the converting memory means, for generating the second address data by performing one of the following operations:

providing one of the third address data and the fifth address data as the second address data to access the converting memory means, and combining the third address data and the fifth address data as the second address data to access the converting memory means;

the controlling means writing the image data in the converting memory means at addresses corresponding to the second address data;

setting means for generating a setting signal to select one of the address converting means; and distributing means, coupled to the setting means, for distributing the image data and the predetermined coordinate data to the one address converting means selected by the setting means;

processing means, different from the controlling means, for processing predetermined characteristics of the image data stored in the converting memory means; and means for outputting processed image data supplied form the processing means.

7. The apparatus of claim 6, wherein the imaging means includes means for detecting supersonic waves.

8. The apparatus of claim 6, wherein the imaging means includes means for detecting electric waves.

9. The apparatus of claim 6, wherein the imaging means includes means for detecting light waves.

10. The apparatus of claim 6, wherein the outputting means includes means for displaying the processed image data.

11. The apparatus of claim 6, wherein the second address data represents orthogonal coordinates.

12. The apparatus of claim 6, wherein the processing means includes means for changing predetermined characteristics of the image data.

13. The apparatus of claim 6, wherein the processing means includes means for compiling the predetermined characteristics of the image data statistically.

14. A method of processing image data formed at predetermined coordinates, comprising the steps of:

selecting one address converting means from a plurality of address converting means wherein each address converting means generates different converted address data;

generating, from the selected address converting means, the converted address data in accordance with the following steps:

storing the image data at a first address of a first memory in the selected address converting means, the first address being identified by first address data corresponding to the predetermined coordinates;

storing second addressed data at a second address of a second memory in the selected address converting means, the second address being identified by third address data corresponding to the first address data;

storing coefficient data in a third memory in the selected address converting means;

reading out the second address data from the second memory;

reading out the coefficient data from the third memory and performing multinomial equation calculations in accordance with the coefficient data to derive fourth address data; and performing one of the following steps:

providing one of the second address data and the fourth address data as the converted address data to access the converting memory means, and combining the second address data and the fourth address data to produce the converted address data to access the converting memory means;

storing the image data at an address, corresponding to the generated converted address data, of a converting memory; and processing a predetermined characteristics of the image data stored in the converting memory by a specialized processor, different from the address converting means, to generate processed image data.

15. The method of claim 14, wherein the converted address data represents orthogonal coordinates.

16. The method of claim 14, wherein the processing step includes the step of changing predetermined characteristics of the image data.

17. The method of claim 14, wherein the processing step includes the step of compiling the predetermined characteristics of the image data statistically.

18. The method of claim 14, further comprising the steps of:

generating the image data at the predetermined coordinates, the image data corresponding to an object; and outputting the processed image data supplied from the processing step.

19. The method of claim 18, wherein the imaging steps includes the step of detecting supersonic waves.

20. The method of claim 18, wherein the imaging step includes the step of detecting electric waves.

21. The method of claim 18, wherein the imaging step includes the stesp of detecting light waves.

22. The method of claim 18, wherein the outputting step includes the step of displaying the processed image data.

23. The method of claim 18, wherein the converted address data represents orthogonal coordinates.

24. The method of claim 18, wherein the processing step includes the step of changing predetermined characteristics of the image data.

25. The method of claim 18, wherein the processing step includes the step of compiling the predetermined characteristics of the image data statistically.

* * * * *